Feb. 27, 1951 A. KÉGRESSE 2,543,412
CHANGE-SPEED TRANSMISSION
Filed Feb 5, 1946 2 Sheets-Sheet 1
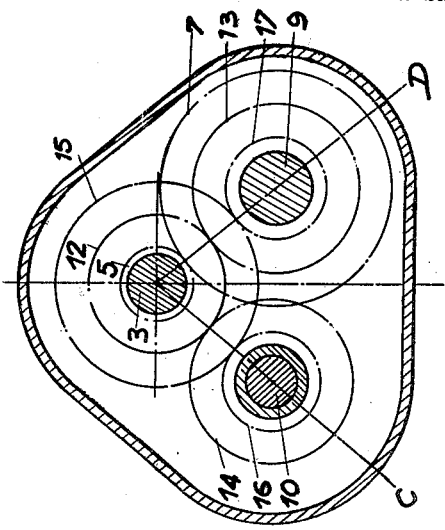
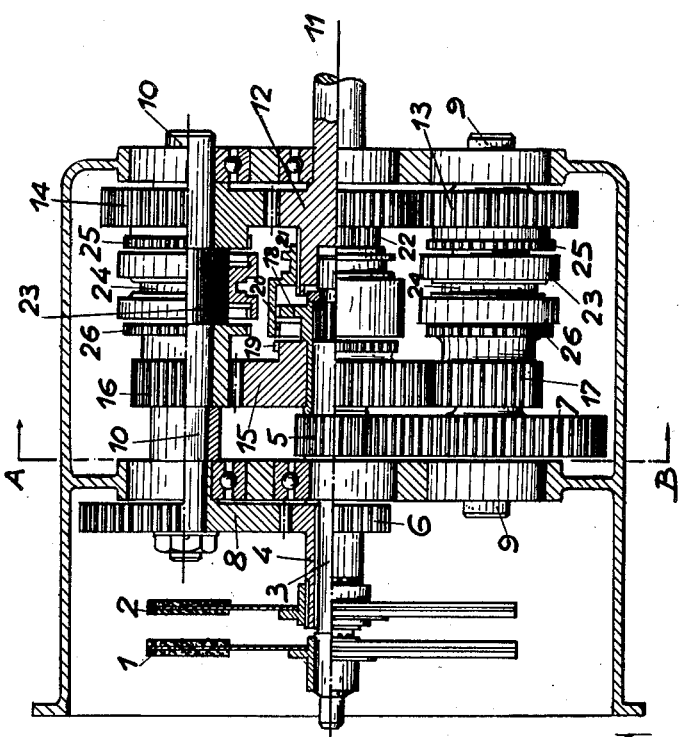
Inventor.
ADOLPHE KEGRESSE, DECEASED.
By. ADOLPHE VALENTIN KEGRESSE, ADMINISTRATOR.
Haseltine, Lake & Co.
Attorneys Feb. 27, 1951 A. KÉGRESSE 2,543,412
CHANGE-SPEED TRANSMISSION
Filed Feb 5, 1946 2 Sheets—Sheet 2

Inventor.
ADOLPHE KEGRESSE, DECEASED.
By ADOLPHE VALENTIN KEGRESSE, ADMINISTRATOR.
BY
Hazeltine, Lake & Co.
AGENTS.

Patented Feb. 27, 1951

2,543,412

UNITED STATES PATENT OFFICE 2,543,412

CHANGE-SPEED TRANSMISSION

Adolphe Kégresse, deceased, late of Le Colifichet-Croissy, France, by Adolphe Valentin Kégresse, administrator, Paris, France Application February 5, 1946, Serial No. 645,505
In France August 7, 1942

Section 1, Public Law 690, August 8, 1946
Patent expires August 7, 1962

6 Claims. (Cl. 74—330)

1

The search for automatic operation of change-speed transmissions as applied to motor cars has led, in some systems, to connecting the engine to the gear trains by means of two independent clutches forming a unit and mounted on the same axis by means of two concentric shafts, as in French Patent No. 861,394 of 28th July 1939 in particular. An arrangement is thus obtained in which some of the shifts, the even numbered shifts for example, are taken on one of the clutches, and the odd numbered shifts on the other.

The use of two clutches on concentric shafts enables a more compact transmission to be obtained with shorter shafts and having less parts than in the usual construction.

The present invention relates to a change-speed transmission of this kind, and provided with two independent clutches having the same axis, and it essentially consists in arranging two countershafts with their axes at the same distance from, and on either side of the extension of the axis of the clutches.

Two change-speed transmissions according to the invention having two clutches and five/seven shifts, one of which is a direct drive, are shown in the accompanying drawing in which, Figure 1 is a part sectional view along the line 1—1 of Figure 2, showing a five-shift transmission;

Figure 2 is a section along the line 2—2 of Figures 1 and 3; and

Figure 3:
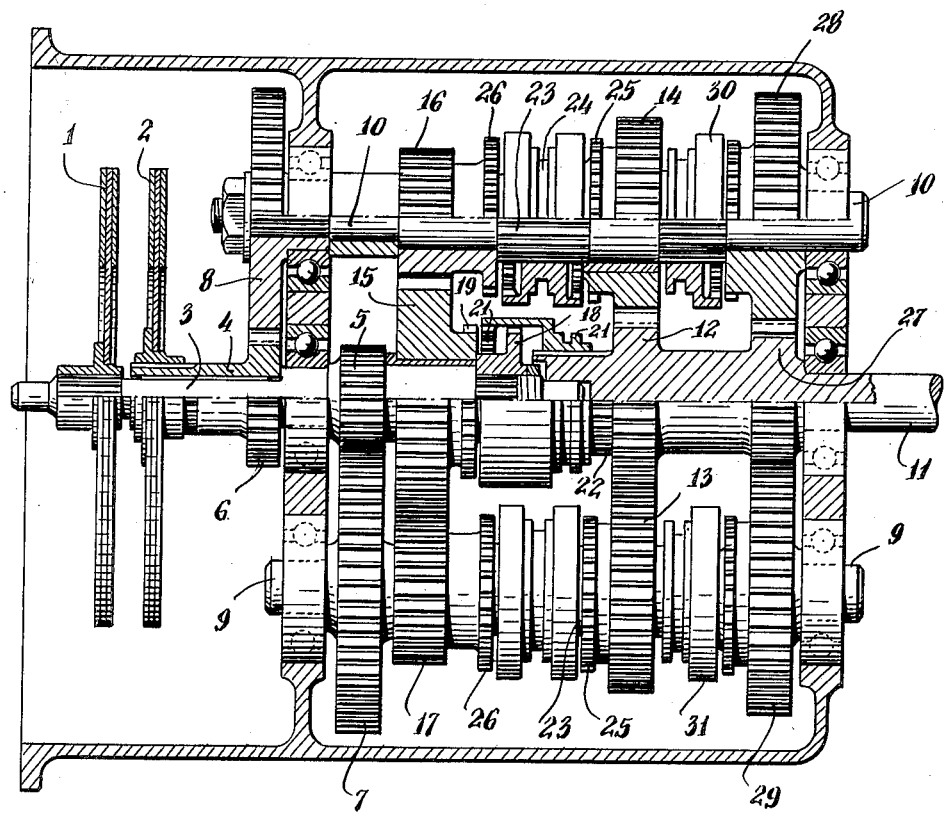
Figure 3 is a part sectional view along the line 1—1 of Figure 2 showing a seven-shift transmission.

The group of clutches is represented by the two discs 1 and 2, Figure 1; the disc 1 is mounted on the central shaft 3, and the disc 2 on the tubular shaft 4.

The central shaft 3 carries a pinion 5 fixed thereon, the tubular shaft 4 is secured to a pinion 6 which is larger than the pinion 5. The pinion 5 of the central shaft constantly meshes with a gear 7 which is itself permanently fixed on a countershaft 9, Figures 1, 2 and 3; the pinion 6 of the tubular shaft 4 constantly meshes with a gear 8 which is itself permanently fixed on a second countershaft 10, Figures 1, 2 and 3.

The distance between the axis of the concentric shafts 3—4 and the axis of each of the countershafts 9 and 10 is the same.

The driven shaft 11 of the transmission is located in the extension of the central shaft 3, Figures 1 and 3; it is fixed to a gear 12 which meshes, on the one hand, with a gear wheel 13

2 loosely mounted on the countershaft 9 and, on the other hand, with a gear wheel 14 loosely mounted on the countershaft 10. The gears 13 and 14 are identical and they have the same number of teeth.

The central shaft 3 carries, in addition to the pinion 5, a gear 15 loosely mounted thereon; said gear 15 meshes, on the one hand, with a pinion 16 loosely mounted on the countershaft 10 and, on the other hand, with a pinion 17 loosely mounted on the countershaft 9. The two pinions 16 and 17 have the same number of teeth and are identical.

The central shaft 3 further carries, fixed thereto, a toothed clutch-wheel 18 of the same size as and having teeth identical with teeth 19 provided integral with the gear 15 which is loosely mounted on the shaft 3; between the clutch-wheels 18 and 19 is located, with the necessary side clearance, an internally toothed ring 20 corresponding with the teeth of the clutch-wheels 18 and 19. The hub of the internally toothed ring 20 is mounted on sliding splines 22 which are integral with the driving shaft 11 of the transmission.

The two countershafts 9 and 10 carry towards their centre and integral therewith, identical splines 23 on each of which slides a double internally toothed clutch-wheel 24, identical for the two countershafts. On the gears 13, 14 and 16, 17 of the shafts 9 and 10, and integral therewith, are provided respectively teeth 25, 26 corresponding to the internal teeth of the double clutch-wheel 24, Figures 1 and 3.

The double sliding clutch-wheels 24 and the hub 21 of the internally toothed ring 20 each carry, as shown in Figures 1 and 3, a groove for engaging a known type of selector fork (not shown) to control the movement of the clutch-wheels.

The control mechanism of said clutch-wheels, which may be automatic or manual, has also not been shown for greater simplicity, as forming no part of the invention.

The operation is as follows:

For the first and second shifts, the internally toothed clutch-ring 20 is engaged with the clutch teeth 19 which are integral with the gear 15 loosely mounted on the central shaft 3.

In first shift, the disc 1 transmits the drive and the disc 2 is free. The pinion 5 drives the gear 7 secured to the countershaft 9. The tooth clutch-wheel 24 of said shaft is brought into engagement with the teeth 26 of the pinion 17 meshing with the gear 15. Said gear 15, by means of the teeth 19 and 20 and the boss 21, drives the shaft 11.

In second shift, the disc 2 transmits the drive, and the disc 1 is released. The pinion 6, which is secured to the tubular shaft 4 driven by the disc 2, actuates the gear 8 secured to the countershaft 10. The toothed clutch-wheel 24 of said shaft 10 is brought into engagement with the teeth 26 of the pinion 16 meshing with the gear 15 which by means of its clutch teeth, drives the shaft 11 as in first shift.

In third shift, the disc 1 again transmits the drive and the disc 2 is released. The toothed clutch-wheel 20 can be returned to its neutral position. The shaft 9 is driven as in first shift, but the toothed clutch-wheel 24 is in this instance brought into engagement with the teeth 25 integral with the gear 13, which drives the gear 12 and consequently the shaft 11 with which said gear 12 is integral.

In fourth shift, the disc 2 transmits the drive again, while the disc 1 is released. The countershaft 10 is driven, as in second shift, by the gears 6 and 8. The clutch-wheel 24 of the countershaft 10 is brought into engagement with the teeth 25 of the gear 14 which drives the shaft 11 by means of the gear 15.

In fifth shift, or direct drive, the internally toothed ring 20, which is slidably keyed on the shaft 11, is coupled to the teeth 18 integral with the shaft 3, driven by the disc 1 which transmits the drive, whereas the disc 2 is released. In the fifth shift position, the driving shaft 3 is therefore directly coupled to the shaft 11.

It will be readily understood that the invention described above may equally well be applied to a change-speed transmission having a larger number of speeds.

It will be observed that the intermediate gears 5—7, 6—8 being determined, two shifts are obtained by means of three gears, two of which are absolutely identical. For example, the third and fourth shifts are obtained by means of the gears 12, 13, 14 of which the two latter are identical.

It will be seen from Figure 3 that by adding three gears, for example to the apparatus described, viz. gear 27 on the shaft 11 and gears 28, 29 on each of the two countershafts, the two latter gears being identical, and by inserting two clutch wheels 30, 31 a seven-shift transmission is obtained. The fact of constructing an apparatus with absolutely identical parts is an important advantage both as regards cost of manufacture and as regards spare parts.

The three additional gears 27, 28 and 29 constitute the sixth and seventh shifts shown in Figure 3.

In order to obtain the fifth shift disc 1 is engaged and disc 2 is released. Secondary shaft 9 is driven as in the first and third shifts by pinions 5 and 7 but clutch wheel 31 is then in engagement with the teeth of gear 29 thereby driving output shaft 11 through gear 27.

In the sixth shift disc 2 is coupled to the engine while disc 1 is released. Secondary shaft 10 is driven as in the second and fourth shifts by gears 6 and 8 and clutch wheel 30 of secondary shaft 10 engages the teeth of gear 28 thereby driving the output shaft 11 through gear 27.

The seventh direct drive shift is obtained as indicated for the fifth shift in the five shift transmission shown in Figure 1.

As stated, the invention enables more compact and more rugged change-speed transmissions to be obtained. As the shafts are shorter, vibrations are thus considerably reduced, hence the possibility of reducing the diameters of the shafts, pinions, ball-bearings, etc.

All these advantages co-operate to produce a decrease in the cost of manufacture and an improvement in the operation.

What is claimed is:

1. In a change-speed mechanism, two independent driving clutches mounted on concentric driving shafts, two countershafts located on either side of said concentric shafts, the axes of said countershafts being equidistant from the projected common axis of said clutches, driving means interposed between each said concentric shaft and a corresponding one of said countershafts, a driven shaft co-axial with said concentric shafts, stepped-ratio gears loosely mounted on said countershafts, a gear rigid with said driven shaft engaging permanently each of said stepped-ratio gears, and a clutch-wheel engaging said loosely mounted gears and sliding splined to each said countershaft.

2. In a change-speed mechanism as claimed in claim 1, said driving means comprising two trains of gears, permanently engaged and having different ratios, said gear trains being splined respectively on each said concentric shaft and on each said countershaft, whereby said countershafts may be driven at different speeds.

3. In a change-speed mechanism as claimed in claim 1, two of said stepped-ratio gears having the same number of teeth, being loosely mounted one on each of said countershafts and controlling respectively the first and the second shifts of the mechanism.

4. In a change-speed mechanism as claimed in claim 1, two of said stepped-ratio gears having the same number of teeth, being loosely mounted one on each of said countershafts and controlling respectively the third and the fourth shifts of the mechanism.

5. In a change-speed mechanism as claimed in claim 3, a clutch-wheel interposed between said driven shaft and the driven gear of said first and second shifts and splined on said driven shaft.

6. In a change-speed mechanism as claimed in claim 2, said stepped-ratio gears being divided into two trains, mounted one on each said countershaft and corresponding respectively to the even-numbered and the odd-numbered shifts of the mechanism.

ADOLPHE VALENTIN KÉGRESSE,
*Administrator of the Estate of Adolphe Kégresse, Deceased.*

REFERENCES CITED

The following references are of record in the file of this patent:

UNITED STATES PATENTS

| Number | Name | Date |
|---|---|---|
| 2,315,808 | Miller | Apr. 6, 1943 |
| 2,386,540 | Campodonico | Oct. 9, 1945 |
| 2,416,154 | Chilton | Feb. 18, 1947 |